April 30, 1929.     J. F. GROVES     1,710,872
INDICATOR
Filed March 6, 1928
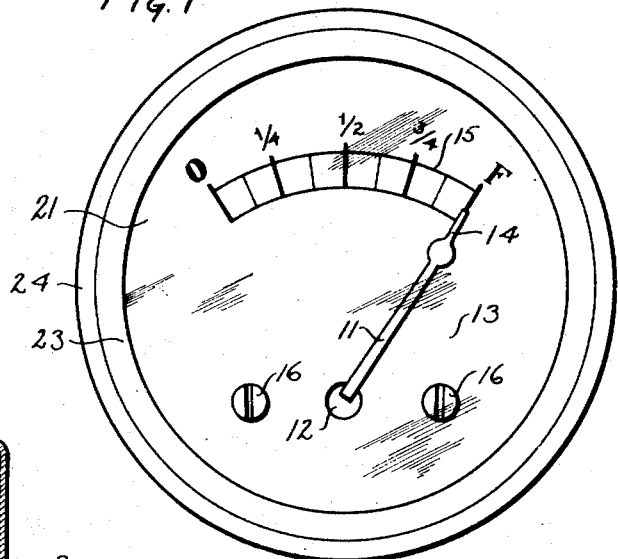
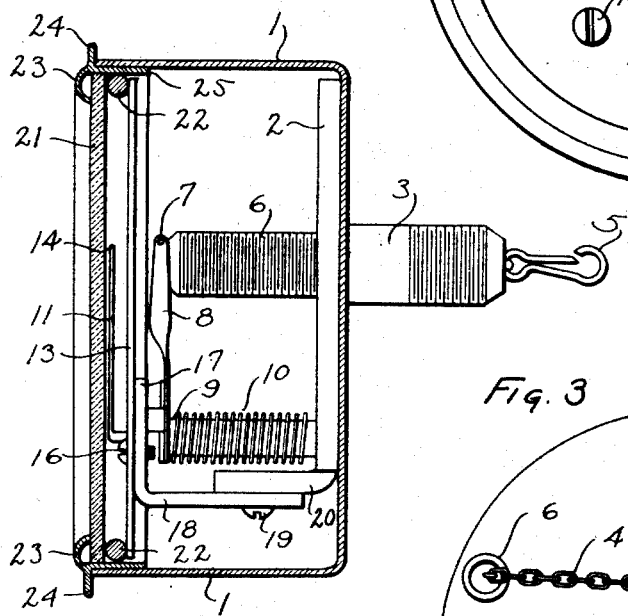
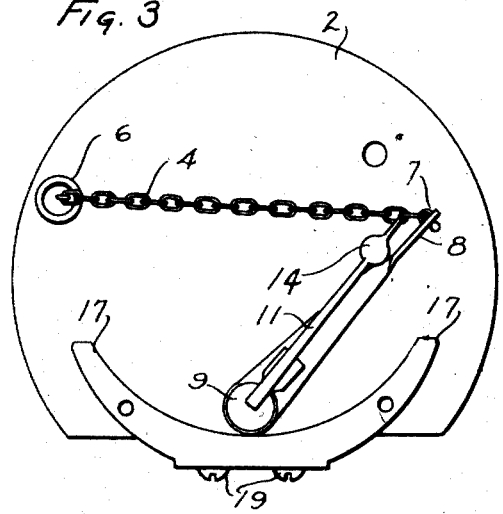
INVENTOR
John F. Groves
BY
ATTORNEY Patented Apr. 30, 1929.

1,710,872

UNITED STATES PATENT OFFICE.

JOHN F. GROVES, OF DAYTON, OHIO, ASSIGNOR TO THE GROLAN MANUFACTURING COMPANY, OF DAYTON, OHIO, A CORPORATION OF DELAWARE.

INDICATOR.

Application filed March 6, 1928. Serial No. 259,534.

My invention relates to indicators, and particularly to indicating instruments for gasoline gauges used on the dashboard of automobiles.

It is the object of my invention to provide a hand indicator on a mechanically operated gasoline gauge to thereby dispense with the moving drum which has heretofore been commonly used in such a construction.

Referring to the drawings:

Figure 1 is a front elevation.

Figure 2 is a section on the line 2—2 of Figure 1.

Figure 3 is a front elevation of the mechanism with the dial plate, glass and bezel removed.

Referring to the drawings in detail, 1 is a cup-shaped housing within which is mounted a vertically disposed bracket plate 2, in which is threaded the sleeve 3 through which passes the chain 4. This chain is connected by the snap 5 to the usual actuating wire of a mechanical gauge.

The free end of the chain which extends out of the end 6 of the tube 3, is connected at 7 to the arm 8. The arm 8 is pivotally mounted on a support 9, carried by the plate 2 and is resisted in its movement in one direction by the helical spring 10 mounted on the support 9.

To this arm 8, but spaced therefrom, is connected the pointer 11 which projects through the aperture 12 of the dial plate 13, and moves over the face of the dial plate 13 so that its free end 14 moves along the scale 15 on the dial plate 13. This dial plate 13 is connected by screws 16 to an arcuate supporting plate 17, which is attached by the bracket arm 18 to a screw 19 to a horizontal projection 20 on the bottom of the plate 2.

Over the face of the dial plate 13 is mounted a glass cover 21, held in position by a locking ring 22 against the shoulder 23 of a bezel 24, which has a sleeve 25 adapted to be slipped within the open end of the casing 1.

I desire to comprehend within my invention such modifications as may be clearly embraced within the claims and the scope of my invention.

Having thus fully described my invention, what I claim is new and desire to protect by Letters Patent, is:

1. In combination, a casing, a dial plate, a hand adapted to move thereover, and means connected to said hand and acting in a line perpendicular to the plane of movement of the hand adapted to actuate the hand.

2. In combination, a casing, a dial plate, a hand adapted to move thereover, a flexible means connected to said hand adapted to pass out of the casing at right angles thereto.

3. In a gauge indicator, a casing, a mechanical means passing through the back of the casing into the interior thereof, a hand moving transversely of said casing, and means of connecting said mechanical means and said hand whereby the fore and aft movement of the mechanical means in the casing will cause the hand to move transversely thereof.

4. In a gauge indicator, a casing, a mechanical means passing through the back of the casing into the interior thereof, a hand moving transversely of said casing, means of connecting said mechanical means and said hand whereby the fore and aft movement of the mechanical means in the casing will cause the hand to move transversely thereof, and yielding means for normally retaining said hand in a predetermined position.

5. In combination, a casing, a sleeve projecting into said casing, means for pivotally supporting a spaced arm, and hand adapted to move transversely of said sleeve, and a chain passing through said sleeve and connected to said arm.

6. In combination, a casing, a sleeve projecting into said casing, means for pivotally supporting a spaced arm and hand adapted to move transversely of said sleeve, a chain passing through said sleeve and connected to said arm, and yielding means associated with the pivotal support of said hand and said arm for maintaining them normally in a predetermined position.

7. In combination, a cup-shaped casing, a plate mounted on the inside of said cup on the back thereof, a sleeve projecting through the back of the cup and said plate to a point on the interior of the cup, a chain reciprocating in said sleeve having its end in the cup, a pivotal support projecting parallel to said sleeve mounted on said plate, an arm and indicating hand adapted to move together in spaced relationship, said arm having its free end connected to said chain, an indicating dial plate supported by said first-mentioned plate, said hand projecting through said indicating dial plate and adapted to travel over a scale on its surface.

8. In combination, a cup-shaped casing, a plate mounted on the inside of said cup on the back thereof, a sleeve projecting through the back of the cup and said plate to a point on the interior of the cup, a chain reciprocating in said sleeve having its end in the cup, a pivotal support projecting parallel to said sleeve mounted on said plate, an arm and indicating hand adapted to move together in spaced relationship, said arm having its free end connected to said chain, an indicating dial plate supported by said first-mentioned plate, said hand projecting through said indicating dial plate and adapted to travel over a scale on its surface, and yielding means for normally maintaining said arm and said hand in a predetermined position.

9. In combination, a cup-shaped casing, a plate mounted on the inside of said cup on the back thereof, a sleeve projecting through the back of the cup and said plate to a point on the interior of the cup, a chain reciprocating in said sleeve having its end in the cup, a pivotal support projecting parallel to said sleeve mounted on said plate, an arm and indicating hand adapted to move together in spaced relationship, said arm having its free end connected to said chain, an indicating dial plate supported by said first-mentioned plate, said hand projecting through said indicating dial plate and adapted to travel over a scale on its surface, yielding means for normally maintaining said arm and said hand in a predetermined position, and a detachable bezel carrying a glass and locking ring adapted to be slidably mounted in the open end of said cup to cover said hand and said dial plate.

10. In combination, a cup-shaped casing, a bracket mounted on the exterior thereof for supporting a dial plate in spaced relationship with respect thereto, pivotal means for supporting an arm behind said dial plate, and a hand projecting through said dial plate, said arm and hand being interconnected, means to guide a chain into said casing adjacent to the plane of movement of said arm, and a chain passing therethrough connected to said arm at one end and adapted to be connected to an actuating means outside of said casing.

11. In combination, a cup-shaped casing, a bracket mounted on the exterior thereof for supporting a dial plate in spaced relationship with respect thereto, pivotal means for supporting an arm behind said dial plate, and a hand projecting through said dial plate, said arm and hand being interconnected, means to guide a chain into said casing adjacent to the plane of movement of said arm, a chain passing therethrough connected to said arm at one end and adapted to be connected to an actuating means outside of said casing, and means to detachably inclose the open end of said casing with a transparent cover.

In testimony whereof I affix my signature.

JOHN F. GROVES.